(12) United States Patent
Jones

(10) Patent No.: US 9,403,247 B2
(45) Date of Patent: Aug. 2, 2016

(54) SCREW TIGHTENING RUBBISH VACUUM

(71) Applicant: DENSO International America, Inc., Southfield, MI (US)

(72) Inventor: Daniel Jones, Maryville, TN (US)

(73) Assignee: Denso International America, Inc., Southfield, MI (US)

( * ) Notice: Subject to any disclaimer, the term of this patent is extended or adjusted under 35 U.S.C. 154(b) by 669 days.

(21) Appl. No.: 13/799,841

(22) Filed: Mar. 13, 2013

(65) Prior Publication Data

US 2014/0262405 A1 Sep. 18, 2014

(51) Int. Cl.
*B23P 19/06* (2006.01)
*B25B 23/00* (2006.01)

(52) U.S. Cl.
CPC ............... *B23P 19/06* (2013.01); *B25B 23/00* (2013.01); *Y10T 29/49716* (2015.01)

(58) Field of Classification Search
CPC .. B23Q 11/0046; B26D 7/1863; B25P 19/06; B25B 23/00
USPC .................... 173/197–199, 1; 408/16, 56, 67
See application file for complete search history.

(56) References Cited

U.S. PATENT DOCUMENTS

| 4,562,756 A | 1/1986 | Otsuki et al. |
| 5,186,084 A | 2/1993 | Totsu |
| 7,591,615 B2 | 9/2009 | Li et al. |
| 2012/0210551 A1 | 8/2012 | Yu et al. |

*Primary Examiner* — Michelle Lopez
(74) *Attorney, Agent, or Firm* — Harness, Dickey & Pierce, P.L.C.

(57) ABSTRACT

A vacuum system for removing rubbish generated during fastening operations is provided. The vacuum system includes a fastening tool for driving the fastener, a suction nozzle attached to the fastening tool and a vacuum source in fluid communication with the suction nozzle. The vacuum system also includes a sensor to detect the position of the fastening tool and a vacuum valve actuator to selectively open or close a vacuum valve to provide vacuum to the suction nozzle according to the position of the fastening tool.

13 Claims, 6 Drawing Sheets

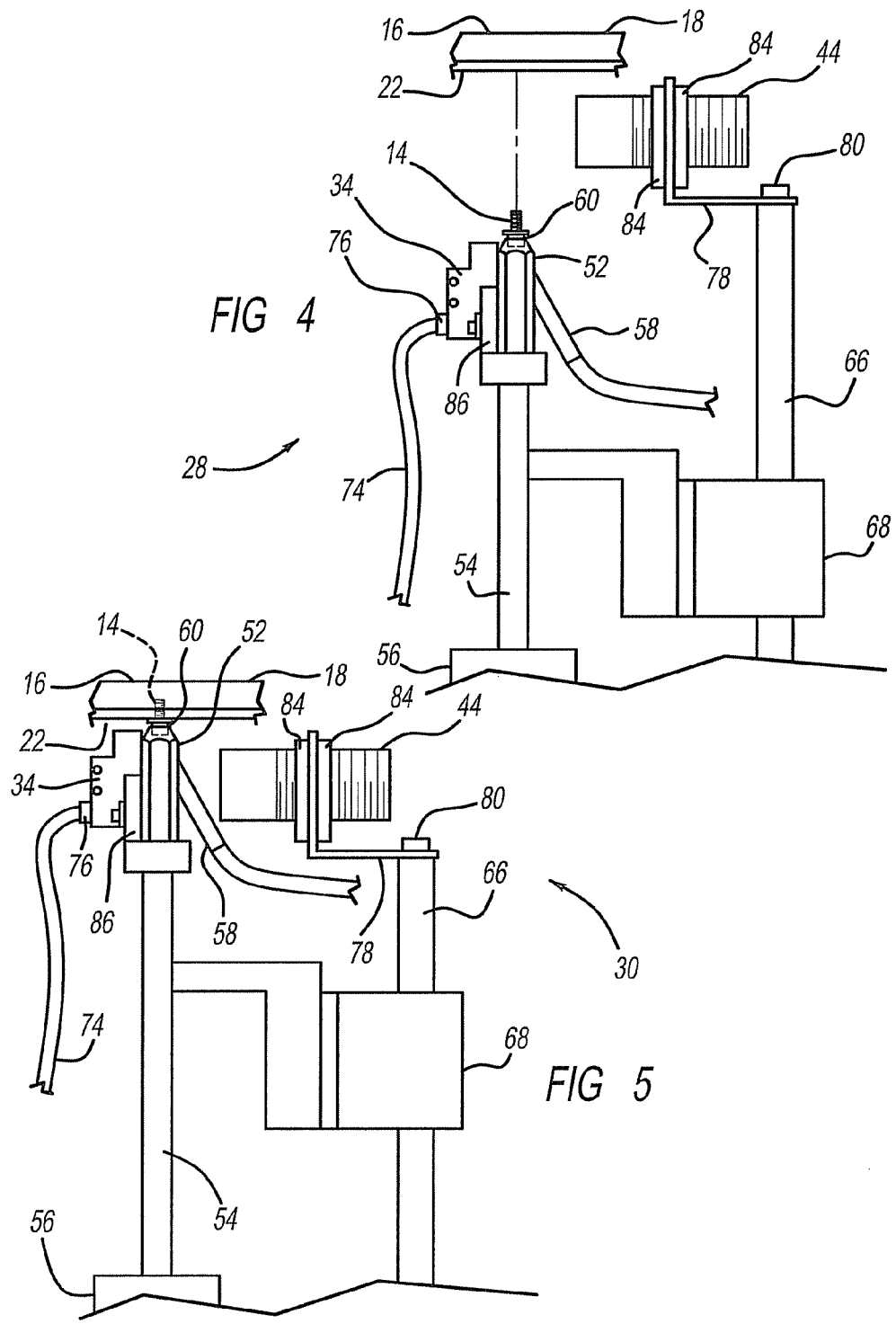

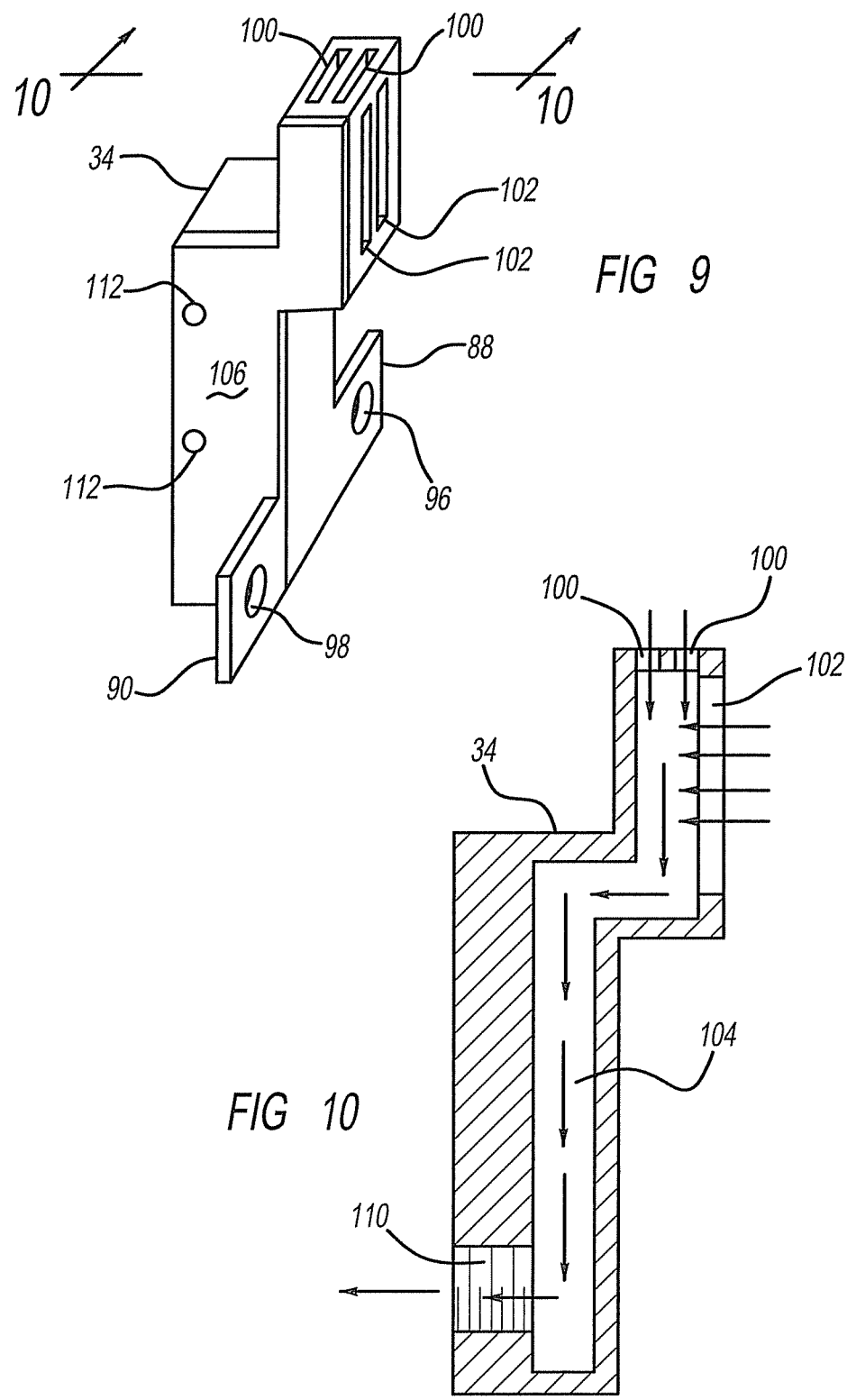

SCREW TIGHTENING RUBBISH VACUUM

FIELD

The present disclosure relates to a vacuum system in which the vacuum system removes rubbish generated during screwdriving operations.

BACKGROUND

The statements in this section merely provide background information related to the present disclosure and may not constitute prior art.

Screwdriving operations in a production manufacturing environment may cause rubbish to be generated. The rubbish may be created when the tip of a screwdriver is inserted into and/or removed from the head of a screw. The rubbish may also be created when the tip of the screwdriver slips against the head of the screw.

Typically, the rubbish generated during screwdriving operations may include dust, flakes, shards and/or slivers. Although the individual rubbish particles may be small in size, accumulations of rubbish may quickly collect on production tools causing the production environment to be dirtied and/or contaminated. Further, rubbish generation and accumulation may provide opportunities for the rubbish to freely deposit onto the finished assembled product. Rubbish deposited onto finished assembled products such as a printed circuit board ("PCB") may cause short circuiting and/or component failure.

Vacuum systems for production manufacturing equipment are widely known in the art. However, such vacuum systems are often integrated into automated manufacturing systems that employ a Programmable Logic Controller ("PLC") to coordinate the manufacturing and the vacuuming processes. Utilizing such systems may be complex and cost prohibitive. Further, such systems may not be retrofitted to existing production equipment.

A need, therefore, exists for a vacuum system in which the vacuum system removes rubbish created during screwdriving operations. More specifically, a need exists for a vacuum system in which the vacuum system removes rubbish during screwdriving operations at the point of generation. Further, a need exists for a simple and low-cost vacuum system in which the vacuum system may be fitted to existing production manufacturing equipment and may utilize existing resources available within a production manufacturing environment.

SUMMARY

The present teaching provide for an apparatus for removing rubbish generated when driving a fastener. The apparatus includes a fastening tool for driving the fastener and a suction nozzle attached to the fastening tool. The apparatus may also include a vacuum source in fluid communication with the suction nozzle, a compressed air supply in fluid communication with the vacuum source and a valve selectively allowing fluid communication between the vacuum source and the compressed air supply. A valve actuator may actuate the valve and a sensor may produce a signal according to a position of the fastening tool such that the valve actuator selectively opens or closes the valve in response to the signal.

The present teaching provides for a method for removing rubbish generated when fastening a component with a fastening tool. The method may entail attaching a suction nozzle to the fastening tool, positioning a sensor to detect the position of the fastening tool, sensing the position of the fastening tool, sending a signal according to the position of the fastening tool and providing vacuum pressure to the suction nozzle in response to the signal.

The present teaching provides for an additional method for retrofitting a vacuum system to a fastening tool. The method may entail connecting a suction nozzle to the fastening tool, attaching a sensor to detect the position of the fastening tool and valving a compressed air source to provide vacuum pressure to the suction nozzle according to the position of the fastening tool.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is an enlarged front view of the connector screw tightening machine illustrating a screwdriver chuck in a first position;

FIG. 5 is an enlarged front view of the connector screw tightening machine illustrating the screwdriver chuck in a second position;

FIG. 9 is a top perspective view of the suction nozzle illustrating top and side vacuum ports; and FIG. 10 is a cross-section view of the suction nozzle along the line 10-10 of FIG. 9.

DETAILED DESCRIPTION

Figure 1:
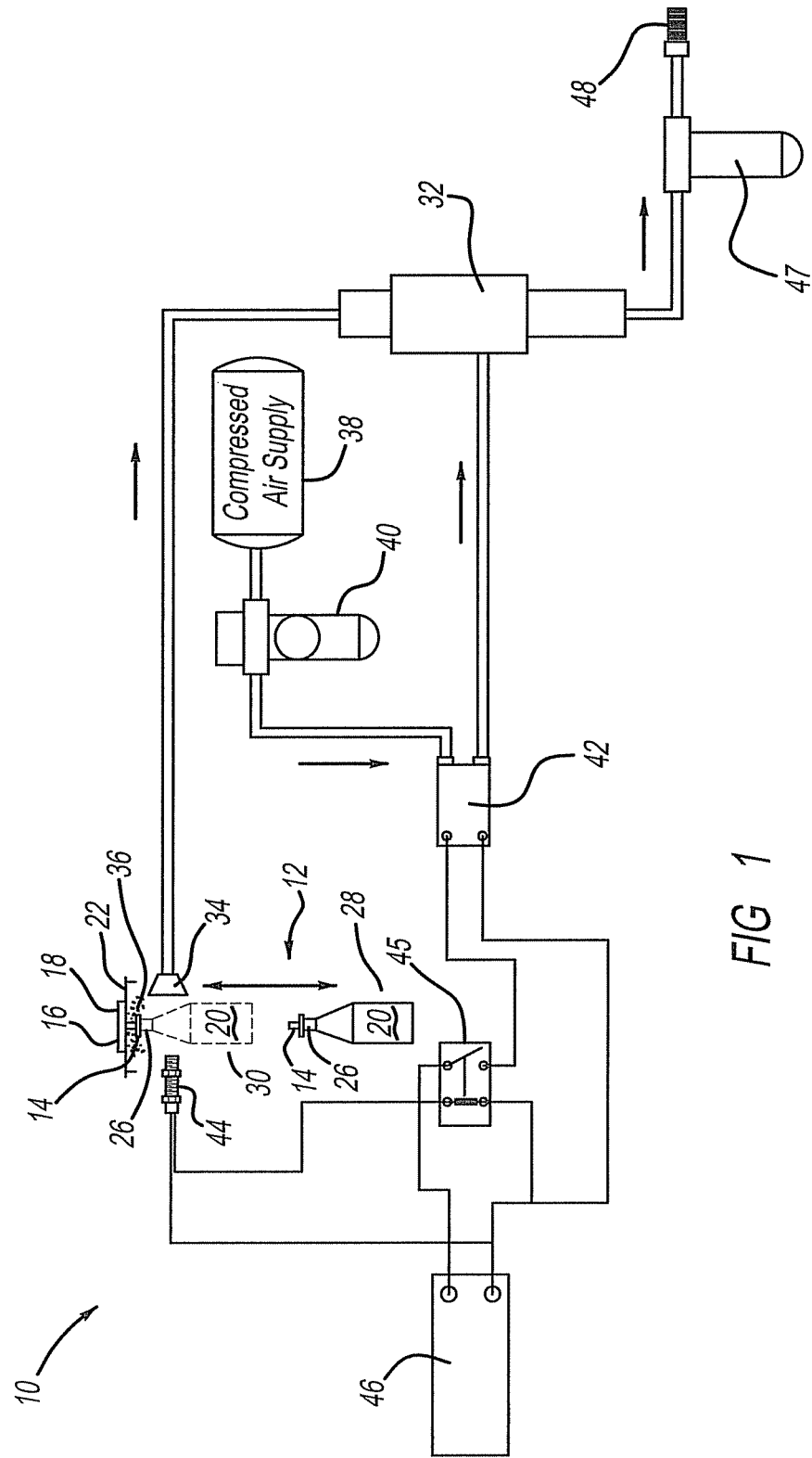
FIG. 1 is a schematic flowchart diagram of the vacuum system of the present invention fitted to a connector screw tightening machine.

The following description is merely exemplary in nature and is not intended to limit the present disclosure, application, or uses. It should be understood that throughout the drawings, corresponding reference numerals indicate like or corresponding parts and features.

With initial reference to FIG. 1, a vacuum system 10 fitted to a connector screw tightening machine (CSTM) 12 is illustrated. The CSTM 12 may be used to fasten screws 14 into a PCB 16 and connectors 18. The CSTM 12 may include a screwdriver 20 to individual fasten the screws 14. The PCB 16 and connectors 18 may be mounted within a jig 22. The jig 22 may hold and locate the PCB 16 in alignment with the connectors 18.

Figure 2:
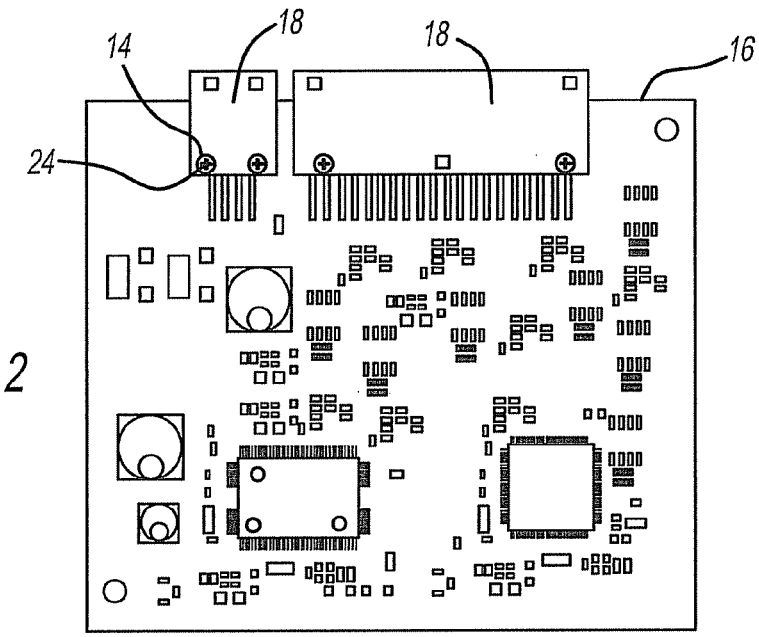
FIG. 2 is top view of a PCB and connectors to be assembled by the connector screw tightening machine.

FIG. 2 depicts an exemplary PCB 16 fastened to connectors 18 with screws 14. The screws 14 may have a head portion 24 having slotted, Torx®, hex-head or Phillips-style grooves, as is well known in the art. Referring back to FIG. 1, the screwdriver 20 may have a fluted-tip 26 to engage the head portion 24 of the screws 14 such that the screwdriver 20 may drive the screws 14 individually.

The screwdriver 20 of the CSTM 12 may be movable between a first position 28 and a second position 30. The first position 28 may be a "stand-by" position such that the screwdriver 20 may be positioned away from the jig 22. The screwdriver 20 may be in the first position 28 while awaiting the loading of the PCB 16 and the connectors 18 into the CSTM 12. The screwdriver 20 may also be in the first position 28 while a screw 14 is loaded onto the fluted-tip 26 of the screwdriver 20. The screwdriver 20 may be in the second position 30 when the screwdriver 20 is performing a screwdriving operation. Screwdriving operations may include the driving of a screw 14 into and/or out of the PCB 16 and the connectors 18 with the screwdriver 20.

The vacuum system 10 fitted to the CSTM 12 may include a suction nozzle 34 connected to the screwdriver 20 for collecting rubbish 36 generated during screwdriving operations. The suction nozzle 34 may be attached to or positioned close to the screwdriver 20 such that the suction nozzle 34 may remove the rubbish 36 as the rubbish 36 is generated.

The suction nozzle 34 may be provided with vacuum pressure to provide suction such that the rubbish 36 may be drawn into the suction nozzle 34. The vacuum pressure to the suction nozzle 34 may be provided by a venturi vacuum generator 32. Venturi vacuum generators may supply vacuum pressure at low-cost while providing fast-cycling of vacuum pressure. The fast-cycling of vacuum pressure may be beneficial for high-speed fastening operations. Further, venturi vacuum generators produce vacuum pressure from compressed air which may be readily available in a production manufacturing environment.

The venturi vacuum generator 32 may create vacuum from compressed air by utilizing fluid dynamic principles, such as venturi, Bernoulli, Coanda, vortex, etc., as is well-known in the art. The venturi vacuum generator 32 may be driven by compressed air provided by a compressed air supply 38. The compressed air supply 38 may comprise any suitable compressed air source, such as an air compressor or a plant compressed air supply system. Compressed air from the compressed air supply 38 may also be regulated by an air pressure regulator 40.

A solenoid pressure valve 42 may control the flow of compressed air from the compressed air supply 38 to the venturi vacuum generator 32. The solenoid pressure valve 42 may selectively open to provide compressed air from the compressed air supply 38 to the venturi vacuum generator 32. The venturi vacuum generator 32 may then generate vacuum pressure to the suction nozzle 34. Closing the solenoid pressure valve 42 may remove the flow of compressed air to the venturi vacuum generator 32, thus, removing vacuum pressure to the suction nozzle 34. Selectively opening the solenoid pressure valve 42 may provide the efficient use of compress air by ensuring that the vacuum system 10 is not continuously drawing compressed air from the compressed air supply 38.

The solenoid pressure valve 42 may be electrically connected to a relay 45. The relay 45 may be electrically connected to a power supply 46. When the relay 45 is not energized, the solenoid pressure valve 42 may be closed and may not provide compressed air to the venturi vacuum generator 32. When the relay 45 is energized, the solenoid pressure valve 42 may open to provide compressed air to the venturi vacuum generator 32.

Pressure to the venturi vacuum generator 32 and, consequently, suction to the suction nozzle 34 may be controlled by a proximity sensor 44. The proximity sensor 44 may be electrically connected to the relay 45 and the power supply 46 such that the proximity sensor 44 may energize the relay 45. The proximity sensor 44 may be inductive, capacitive, photoelectric, ultrasonic, etc. as is well known in the art. The proximity sensor 44 may be positioned near and/or adjacent to the jig 22 such that the proximity sensor 44 may detect whether the screwdriver 20 is in the second position 30. Utilizing the proximity sensor 44 to control the supply of vacuum pressure to the suction nozzle 34 may reduce cost and complexity since a separate electronic controller and/or microprocessor is not required to control the vacuum system 10. Additionally, the absence of a separate controller and/or microprocessor may allow the vacuum system 10 to be retrofitted to existing production manufacturing equipment. The vacuum system 10 may be installed without requiring integration into the electronic control system or PLC of an existing production manufacturing tool.

In operation, the screwdriver 20 may be in the first position 28 while preparing for a screwdriving operation. When the screwdriver 20 moves to the second position 30 to perform the screwdriving operation, the proximity sensor 44 may detect the screwdriver 20 in the second position 30. When detected in the second position 30, the proximity sensor 44 may energize the relay 45 to provide compressed air to the venturi vacuum generator 32 such that the venturi vacuum generator 32 may provide vacuum pressure to the suction nozzle 34. While screwdriving operations are occurring, the vacuum pressure through the suction nozzle 34 may draw in rubbish generated by the screwdriving operation into the suction nozzle 34. The rubbish may travel through the venturi vacuum generator 32 and may be captured in the filter 47. Any remaining air may be exhausted out of the muffler 48. After the completion of screwdriving operations, the screwdriver 20 may move from the second position 30 to the first position 28. The proximity sensor 44 may detect the screwdriver 20 in the first position 28 and de-energize the relay 45 to stop the flow of compressed air to the venturi vacuum generator 32. Removing the flow of compressed air to the venturi vacuum generator 32 will cease the flow of vacuum pressure to the suction nozzle 34.

Preferred Embodiment

Figure 3:
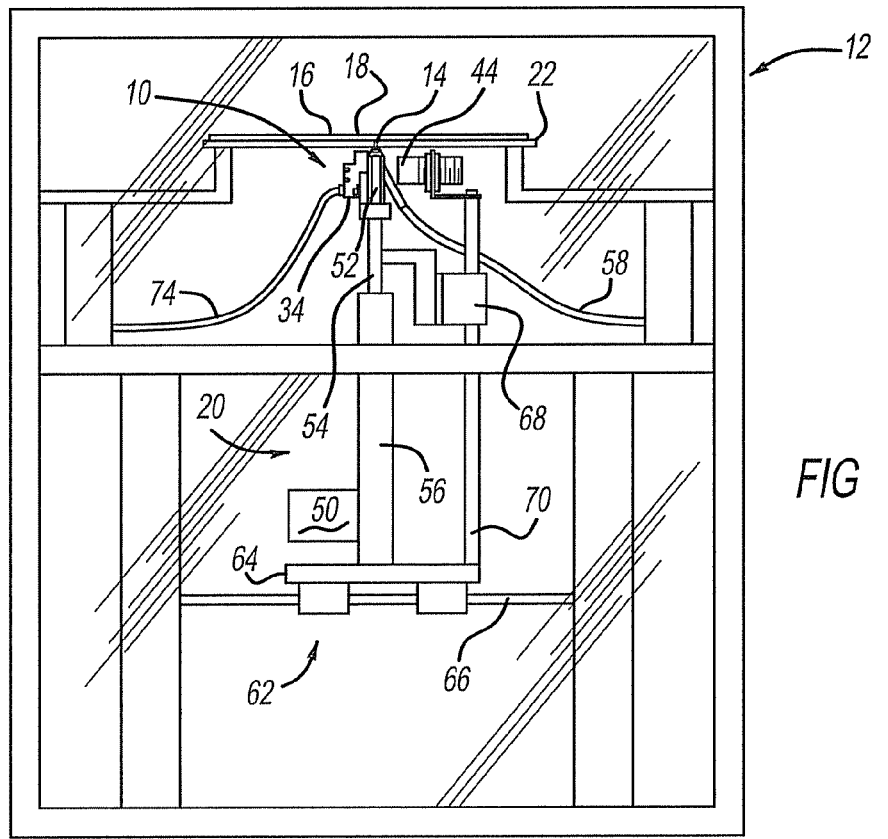
FIG. 3 is a front view of the vacuum system fitted to a connector screw tightening machine.

In a preferred embodiment of the invention, a vacuum system 10 fitted to a CSTM 12 is illustrated in FIGS. 3 to 5. The CSTM 12 may include a screwdriver 20 for fastening screws 14 into a PCB 16 attached to connectors 18. The PCB 16 and connectors 18 may be mounted within a jig 22.

The screwdriver 20 may be an automatic screwdriver as disclosed in U.S. Pat. No. 5,186,084. The screwdriver 20 may include a bit (not shown) positioned within the chuck 52. The bit may have a fluted-tip to engage a head portion (not shown) of the screws 14 such that the screwdriver 20 may drive the screws 14 individually. The bit of the screwdriver 20 may be driven by a motor 50, as is well known in the art.

As illustrated in FIGS. 3 and 4, the screwdriver 20 may have a chuck 52 attached to a telescopic spindle 54. The telescopic spindle 54 may extend from and retract into a housing 56 to allow the chuck 52 to move with respect to the housing 56. The screwdriver 20 may also include a screw feed line 58 to supply the screwdriver 20 with screws 14. The screws 14 may enter the chuck 52 such that individual screws 14 may be loaded onto the bit. When loaded, the screw 14 may extend from the chuck 52 through an orifice 60 such that the individual screw 14 is exposed and ready to be driven into the PCB 16 and connectors 18 by the screwdriver 20. The operation of the screwdriver 20 may be controlled by an electronic controller (not shown).

The screwdriver 20 may be mounted to an actuated slide assembly 62 to allow the screwdriver 20 to move along the horizontal and vertical axes. The actuated slide assembly 62 may include a base 64 attached to the housing 56 of the screwdriver 20. The base 64 may be slidingly attached to a horizontal rail 66. The base 64 may be threadingly attached to a linear guide screw (not shown) and a servo motor (not shown). The servo motor may rotate the linear guide screw such that the base 64 may travel laterally along the horizontal rail 66.

The telescopic spindle 54 of the screwdriver 20 may be attached to a bracket 68. The bracket 68 may be slidingly attached to a vertical rail 70. The vertical rail 70 may be attached to the base 64. The bracket 68 may slide along the vertical rail 70 such that the chuck 52 may extend from or retract into the housing 56. The bracket 68 may also be threadingly attached to a linear guide screw (not shown) driven by a servo motor (not shown). The servo motor may rotate the linear guide screw such that the chuck 52 may extend from or retract into the housing 56. The servo motors for the base 64 and the bracket 68 may be controlled by the electronic controller such that the positioning of the screwdriver 20 may be automated, as is well known in the art.

The actuated slide assembly 62 may extend or retract the telescopic spindle 54 to raise or lower the chuck 52 between a first position 28 and a second position 30. FIG. 4 depicts the chuck 52 in the first position 28 such that the chuck 52 is lowered and positioned away from the jig 22. The first position 28 may be a "stand-by" position during which the chuck 52 may be awaiting the loading of the PCB 16 and the connectors 18 into the CSTM 12. The chuck 52 may also be in the first position 28 while a screw 14 is loaded onto the bit within the chuck 52. FIG. 5 shows the chuck 52 in the second position 30 such that the chuck 52 is raised and positioned near the PCB 16 and connectors 18 in order to perform a screwdriving operation.

Figure 6:
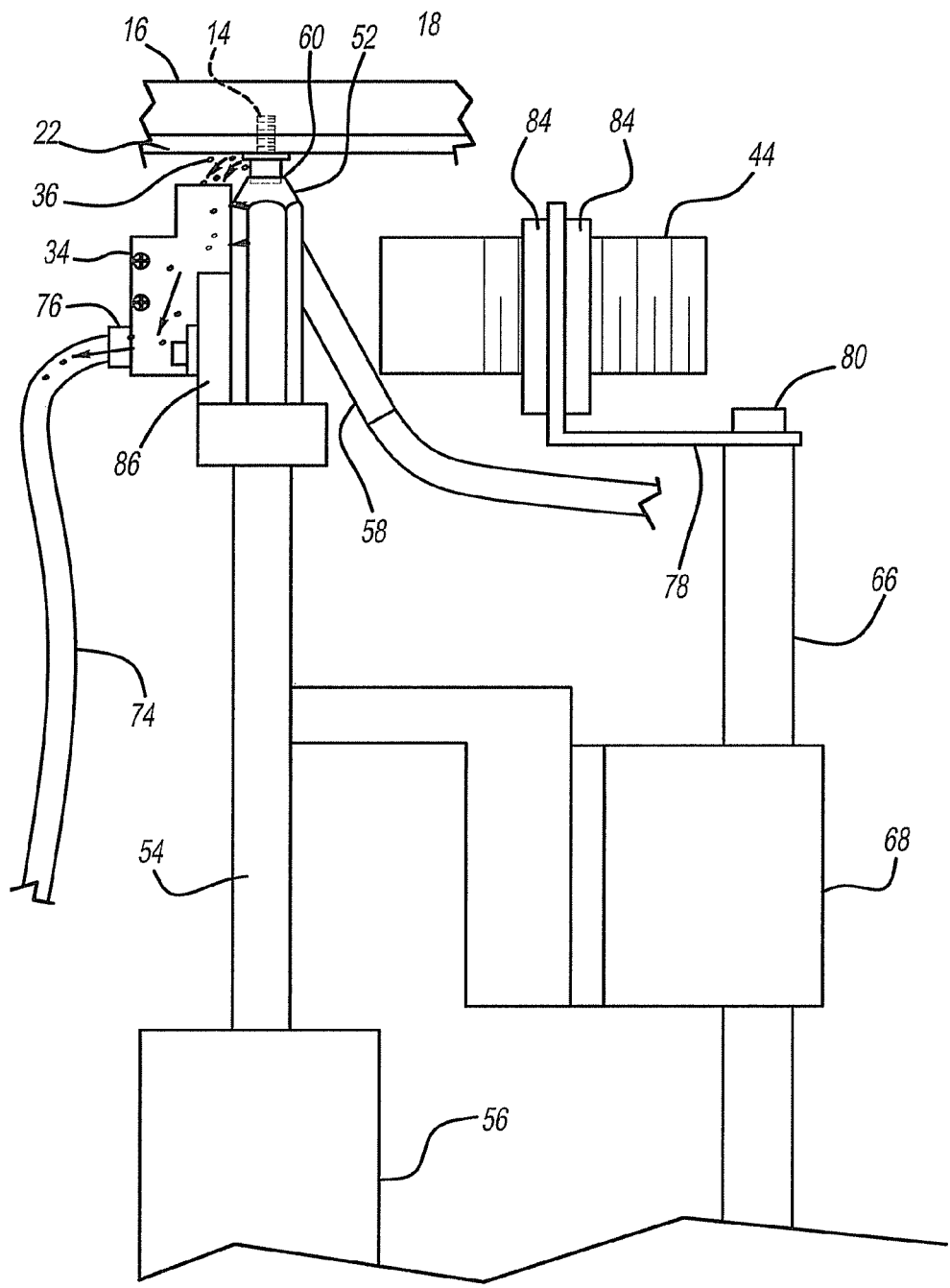
FIG. 6 is an enlarged front view of the connector screw tightening machine illustrating the screwdriver chuck in the second position and a suction nozzle removing rubbish generated during a screwdriving operation.

A proximity sensor 44 may be attached to the vertical rail 70 to detect whether the chuck 52 is in the first position 28 or the second position 30. When the proximity sensor 44 detects the chuck 52 in the second position, the proximity sensor 44 may energize a solenoid pressure valve (not shown) to provide compressed air to a venturi vacuum generator (not shown) to provide vacuum pressure to a suction nozzle 34 attached to the chuck 52. As illustrated in FIG. 6, the suction nozzle 34 may draw in the rubbish 36 while screwdriving operations are occurring such that the rubbish 36 may be captured as the rubbish 36 is being generated. In addition, removing the rubbish 36 during screwdriving operations may also reduce and/or prevent the rubbish 36 from depositing and accumulating onto the PCB 16 and/or the connectors 18.

The proximity sensor 44 may be an inductive proximity sensor, as is well known in the art. Generally, automatic screwdriver systems may be constructed from metal such as stainless steel or aluminum in order to endure the harshness of a production manufacturing environment. Inductive proximity sensors may provide non-contact detection of metal targets by emitting an electro-magnetic sensing field. When a metal target enters the electro-magnetic sensing field, the inductive proximity sensors may detect a change in the field and then trigger a sensor output.

It should be understood to one of ordinary skill in the art that the invention is not limited to an inductive proximity sensor for detecting the occurrence of screwdriving operations. Other types of proximity sensors such as capacitive, photoelectric, ultrasonic, etc. may be used to detect the position of the chuck 52. The type of proximity sensor used may depend on the demands of the production manufacturing environment, the construction of the screwdriver system, the type of screwdriving operation, etc. For example, a capacitive proximity sensor may be used where the screwdriver 20 and/or the chuck is manufactured from a non-metallic material.

The proximity sensor 44 may be attached to a sensor mount 78 fastened to the vertical rail 70 to ensure that the proximity sensor 44 may be in position to detect whether the chuck 52 is in the first position 28 or the second position 30. The sensor mount 78 may be fastened to the vertical rail 70 by a mounting bolt 80. The proximity sensor 44 may have a threaded exterior surface 82 such that the proximity sensor 44 may be attached to the sensor mount 78 with lock nuts 84. Tightening the lock nuts 84 against both sides of the sensor mount 78 may fasten the proximity sensor 44 to the sensor mount 78. Loosening the lock nuts 84 may allow the distance between the proximity sensor 44 and the chuck 52 to be adjusted to ensure that the chuck 52 may be within detection range of the proximity sensor 44 when the chuck 52 is in the second position 30.

The proximity sensor 44 may be mounted to the vertical rail 70 such that the chuck 52 may be within the detection range of the proximity sensor 44 when the chuck 52 is in the second position 30 but not within detection range when the chuck 52 is in the first position 28. Typically, the detection range of inductive proximity sensors may be between 5 millimeters to 50 millimeters. Mounting the proximity sensor 44 to the vertical rail 70 may also ensure that the lateral distance between the proximity sensor 44 and the chuck 52 remains constant regardless of the lateral position of the screwdriver 20. A constant lateral distance between the proximity sensor 44 and the chuck 52 may ensure that the chuck 52 is within the detection range of the proximity sensor 44 when in the second position 30 despite the horizontal position of the screwdriver 20.

Figure 7:
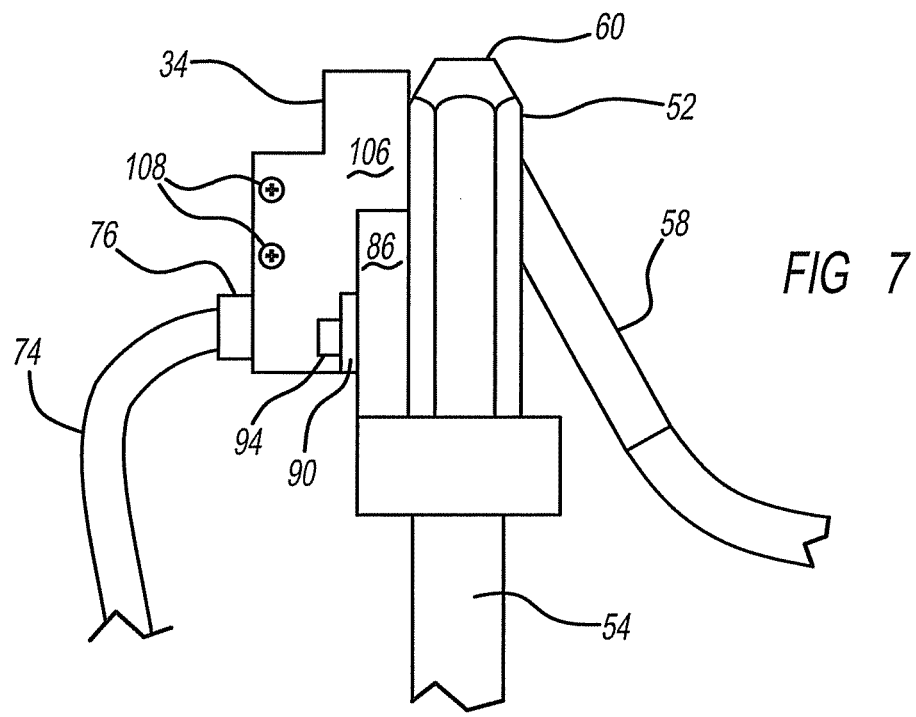
FIG. 7 is a front view of the suction nozzle attached to the screwdriver chuck.
Figure 8:
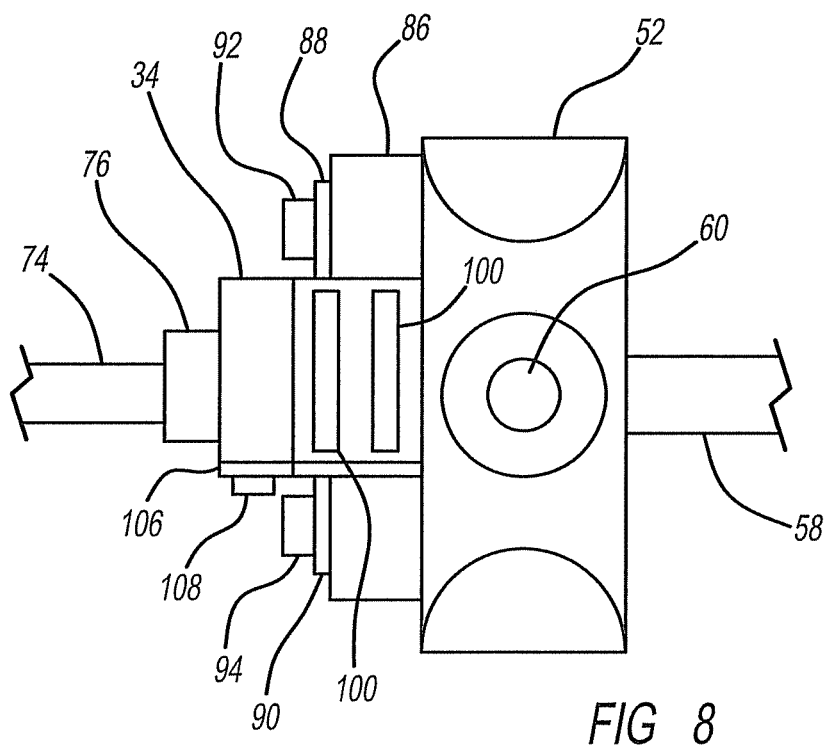
FIG. 8 is a top view of the suction nozzle attached to the screwdriver chuck.

Referring to FIGS. 7 through 9, the suction nozzle 34 may be attached to the chuck 52. The suction nozzle 34 may be constructed from a lightweight and durable material such as aluminum. The suction nozzle 34 may have a first flange 88 and a second flange 90 for attaching the nozzle 34 to a sideplate 86 of the chuck 52. The suction nozzle 34 may be fastened to the sideplate 86 by a first flange bolt 92 and a second flange bolt 94. The first flange 88 may have a first flange hole 96 through which the first flange bolt 92 threadingly fastens to the sideplate 86. Similarly, the second flange 90 may have a second flange hole 98 through which the second flange bolt 94 threadingly fastens to the sideplate 86.

The suction nozzle 34 may be attached to the chuck 52 such that the suction nozzle 34 may be in a position to remove the rubbish 36 as the rubbish 36 is generated during a screwdriving operation. A vacuum line 74 may fluidly connect the suction nozzle 34 to the venturi vacuum generator to provide vacuum pressure to the suction nozzle 34. The vacuum line 74 may have a fitting 76 that may be threadingly attached to a threaded bore 110 of the suction nozzle 34.

The suction nozzle 34 may have top vents 100 and side vents 102 positioned adjacent the chuck 52 and towards the orifice 60. The top vents 100 may be positioned to immediately capture rubbish generated by the screwdriving operation. The side vents 102 may be positioned to remove rubbish that may accumulate around the chuck 52 and/or within small gaps between the suction nozzle 34 and the chuck 52.

As shown in FIG. 10, the suction nozzle 34 may have a channel 104 that may fluidly connect the threaded bore 110 with the top vents 100 and the side vents 102. The vacuum line 74 may provide vacuum pressure through the threaded bore 110 and the channel 104 to allow the top vents 100 and the side vents 102 to capture the rubbish 36. Referring back to FIG. 6, the rubbish 36 may enter the suction nozzle 34 through the top vents 100 and/or the side vents 102 and travel through the channel 104. The rubbish 36 may exit the nozzle 34 through the threaded bore 110 and the vacuum line 74.

It should be known to one of ordinary skill in the art that the shape of the suction nozzle 34, the top vents 100 and the side vents 102 and the channel 104 may be any shape to accommodate fitment of the suction nozzle 34 to the chuck 52 while providing sufficient suction force and rubbish suction coverage to the chuck 52. In addition, the top vents 100 and the side vents 102 may be of any size and shape. The size and shape of the top vents 100 and the side vents 102 may be determined according to the size of the rubbish particulate, the amount of rubbish produced, vacuum pressure, minimum pressure loss between the vents and the suction port.

Referring back to FIGS. 7 through 9, the suction nozzle 34 may have a cover 106 to provide access to the channel 104. The cover 106 may be attached to the suction nozzle 34 with cover fasteners 108. The cover fasteners 108 may threadingly engage holes (not shown) in the suction nozzle 34. The cover 106 may have holes 112 through which the cover fasteners 108 may threadingly fasten the cover 106 to the suction nozzle 34.

The cover fasteners 108 may be removed to provide access to the channel 104 such that rubbish accumulation within the channel 104 may be removed. The rubbish 36 may build up within the channel 104 and clog the channel 104. Clogging may reduce the vacuum pressure provided to the top vents 100 and the side vents 102. A reduction in vacuum pressure may reduce the efficiency of the vacuum system 10. Further, as the rubbish 36 accumulates, the vacuum pressure may continue to drop until the channel 104 is fully clogged.

The cover 106 may be removed without removing the suction nozzle 34 from the chuck 52 such that the channel 104 may be quickly accessed. As shown in FIG. 9, the second flange 90 may be attached to the cover 106. The cover 106 may be removed by unfastening the second flange bolt 94 and the cover fasteners 108. Despite removing the second flange bolt 94 and the cover fasteners 108, the suction nozzle 34 may remain attached to the chuck 52 by the first flange bolt 92. The ability to remove the cover 106 without removing the suction nozzle 34 from the chuck 52 may allow the channel 104 to be quickly cleaned, thereby, reducing the time that the CSTM 12 may be out of service.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for removing rubbish generated when driving a fastener, the apparatus comprising:
    a fastening tool for driving the fastener;
    a suction nozzle attached to the fastening tool;
    a vacuum source in fluid communication with the suction nozzle;
    a compressed air supply in fluid communication with the vacuum source;
    a valve selectively allowing fluid communication between the vacuum source and the compressed air supply;
    a valve actuator to actuate the valve; and
    a sensor to produce a signal according to a position of the fastening tool wherein the valve actuator selectively opens or closes the valve in response to the signal;
    wherein the sensor is a proximity sensor.

2. The apparatus of claim 1, wherein the vacuum source is a venturi vacuum generator.

3. The apparatus of claim 1, wherein the valve actuator is a solenoid pressure valve.

4. The apparatus of claim 1, wherein the signal energizes a relay to actuate the valve actuator.

5. The apparatus of claim 1, wherein the fastening tool is an automatic screwdriver.

6. The apparatus of claim 1, further comprising:
    a removable cover providing access to a channel inside the suction nozzle.

7. The apparatus of claim 1, wherein the suction nozzle includes vents directed towards the fastening tool.

8. A method for removing rubbish generated when fastening a component with a fastening tool, the method comprising:
    attaching a suction nozzle to the fastening tool;
    positioning a sensor to detect the position of the fastening tool;
    sensing the position of the fastening tool;
    sending a signal according to the position of the fastening tool; and
    providing vacuum pressure through the suction nozzle in response to the signal;
    wherein positioning a sensor to detect the position of the fastening tool includes positioning the sensor adjacent to the component.

9. The method of claim 8, further comprising:
    removing vacuum pressure to the suction nozzle in response to the signal.

10. The method of claim 8, wherein sensing the position of the fastening tool comprises detecting the presence of a fastening tool.

11. The method of claim 8, wherein positioning a sensor to detect the position of the fastening tool comprises positioning the sensor adjacent to the component such that the distance between the sensor and the fastening tool remains constant when fastening the component with the fastening tool.

12. A method for retrofitting a vacuum system to a fastening tool, the method comprising:
    connecting a suction nozzle to the fastening tool;
    positioning a sensor to detect the position of the fastening tool; and
    valving a vacuum source to provide vacuum pressure to the suction nozzle according to the position of the fastening tool;
    wherein positioning a sensor to detect the position of the fastening tool includes positioning the sensor adjacent to a component being fastened with the fastening tool.

13. The method of claim 12, wherein the vacuum source generates vacuum pressure from compressed air.

* * * * *